United States Patent
Abbasfar et al.

(10) Patent No.: US 8,031,802 B2
(45) Date of Patent: Oct. 4, 2011

(54) MULTI-CHANNEL SIGNALING WITH EQUALIZATION

(75) Inventors: Aliazam Abbasfar, Mountain View, CA (US); Amir Amirkhany, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 12/515,390

(22) PCT Filed: Nov. 9, 2007

(86) PCT No.: PCT/US2007/084237
§ 371 (c)(1),
(2), (4) Date: Jan. 13, 2010

(87) PCT Pub. No.: WO2008/063918
PCT Pub. Date: May 29, 2008

(65) Prior Publication Data
US 2010/0128813 A1    May 27, 2010

Related U.S. Application Data

(60) Provisional application No. 60/860,634, filed on Nov. 21, 2006, provisional application No. 60/917,312, filed on May 10, 2007.

(51) Int. Cl.
*H04L 27/00* (2006.01)
(52) U.S. Cl. .................... 375/295; 370/480; 365/189.17
(58) Field of Classification Search .................. 365/206; 375/260, 295, 232, 316, 346, 350, 259, 285; 370/480, 535, 366
See application file for complete search history.

(56) References Cited

U.S. PATENT DOCUMENTS

| | | | | |
|---|---|---|---|---|
| 5,602,872 A * | 2/1997 | Andrews | ........................ | 375/234 |
| 7,139,290 B2 * | 11/2006 | Braun | ........................... | 370/536 |
| 7,720,133 B2 * | 5/2010 | Koyama et al. | ................ | 375/147 |
| 2002/0032004 A1 * | 3/2002 | Widrow | ......................... | 455/22 |
| 2006/0018344 A1 | 1/2006 | Pamarti | | |
| 2006/0133523 A1 | 6/2006 | Stojanovic | | |
| 2006/0133538 A1 | 6/2006 | Stojanovic | | |
| 2008/0310479 A1 * | 12/2008 | Koslar et al. | ................... | 375/131 |

OTHER PUBLICATIONS

Amirkhany, A et al., Multi-tone signaling for high-speed backplane electrical links, IEEE Communications Society, Globecom 2004, 2004 IEEE, pp. 1111-1117, XP010757694.
Stojanovic, V. et al., Optimal linear precoding with theoretical and practical data rates in high-speed serial-link backplane communication, IEEE Communication Society, 2004 IEEE, pp. 2799-2806, XP010709742.
Amirkhany, A. et al., Analog multi-tone signaling for high-speed backplane electrical links, 2006 IEEE, pp. 1-6, XP007904713.

(Continued)

*Primary Examiner* — Dang Nguyen
(74) *Attorney, Agent, or Firm* — Morgan, Lewis & Bockius LLP

(57) ABSTRACT

A data transmission circuit comprises a plurality of data preparation circuits and a combiner. Each data preparation circuit receives a respective data stream and generates a respective sub-channel signal. Each respective data stream has a respective symbol rate and a respective Nyquist bandwidth. The combiner combines the respective sub-channel signals to generate a data transmission signal having an associated bandwidth. The bandwidth associated with the data transmission signal is greater than or equal to the sum of the Nyquist bandwidths for the respective data streams. Each data preparation circuit comprises a programmable linear equalizer that equalizes the respective sub-channel signal across the bandwidth of the data transmission signal.

30 Claims, 13 Drawing Sheets

OTHER PUBLICATIONS

Amirkhany, A. et al., A 24Gb/s software programmable multi-channel transmitter, 2007 Symposium on VLSI Circuits Digest of Technical Papers, pp. 38-39, XP031142446.

International Search Report and Written Opinion issued in PCT/US2007/084237, May 26, 2008, 12 pages.

International Preliminary Examination Report for PCT/US07/84237 dated Sep. 7, 2010.

* cited by examiner

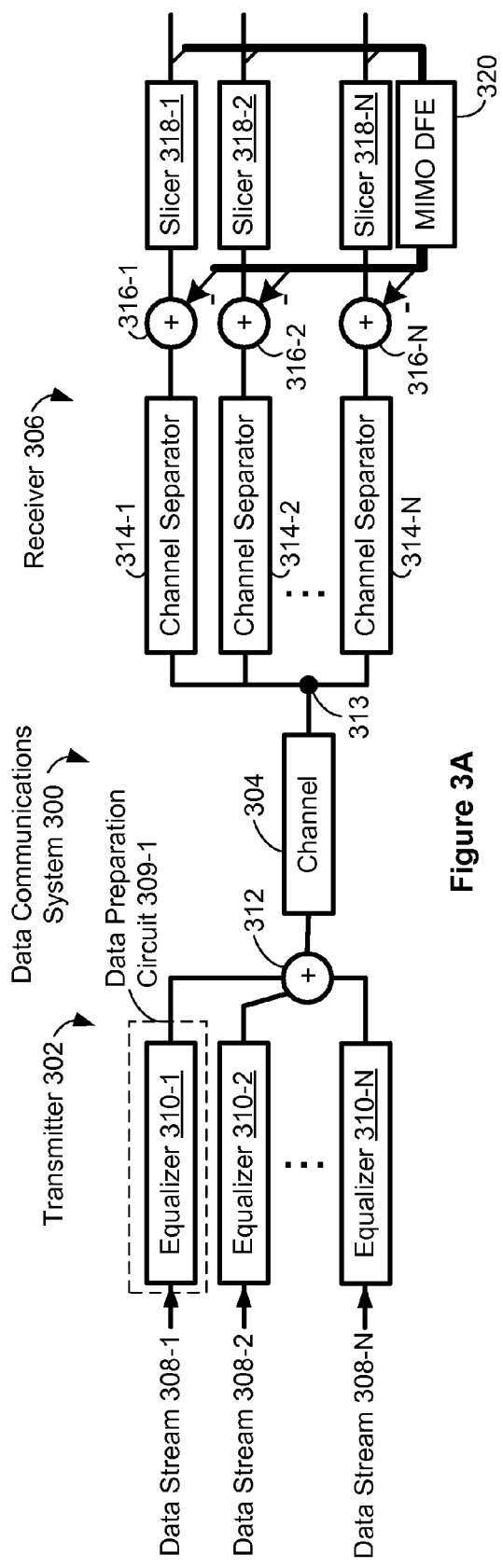
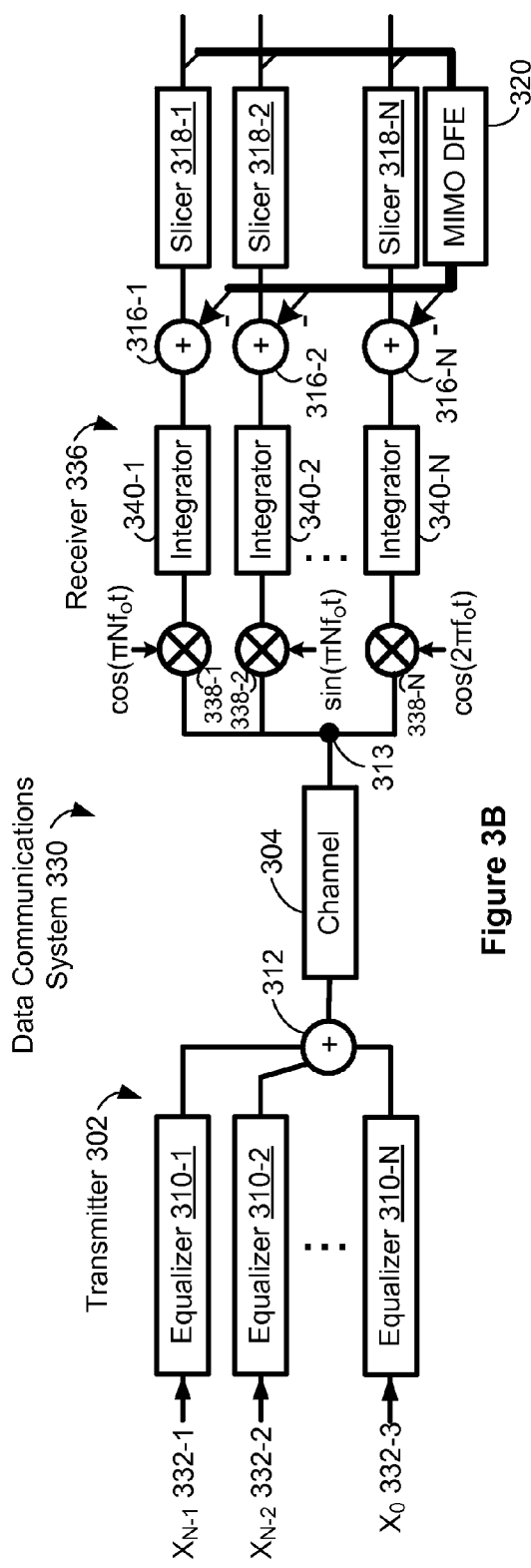
Figure 3A
Figure 3B

Matrix 500 of a Multi-Input Multi-Output (MIMO) Decision-Feedback Equalizer (DFE)

$$\begin{pmatrix} \text{Diagonal Matrix Element 502} & & & \\ \text{Non-Diagonal Matrix Element 504} & \text{Diagonal Matrix Element} & & \\ & & \text{Diagonal Matrix Element} & \\ & & & \text{Diagonal Matrix Element} \end{pmatrix}$$

MULTI-CHANNEL SIGNALING WITH EQUALIZATION

RELATED APPLICATIONS

This application is a claims priority to international application serial number PCT/US2007/084237, filed Nov. 9, 2007, which claims benefit of U.S. Provisional Application No. 60/860,634, filed Nov. 21, 2006, and U.S. provisional Application No. 60/917,312, filed May 10, 2007, which are incorporated herein by reference in their entirety.

TECHNICAL FIELD

The subject matter disclosed herein relates generally to the field of communications and more particularly to high speed electronic signaling within and between integrated circuits.

BACKGROUND

High speed data communications over a communications channel such as a backplane electrical link present significant engineering challenges. For example, low bit-error-rate requirements place limits on channel bandwidth utilization for baseband signaling, particularly when the channel is a notched channel.

BRIEF DESCRIPTION OF THE DRAWINGS

FIGS. 3A-3C are block diagrams of a data communications system in accordance with some embodiments.

FIG. 5 is a schematic illustration of matrix elements associated with a multi-input multi-output (MIMO) decision feedback equalizer (DFE) in accordance with some embodiments.

Like reference numerals refer to corresponding parts throughout the drawings.

DESCRIPTION OF EMBODIMENTS

Figure 1A:
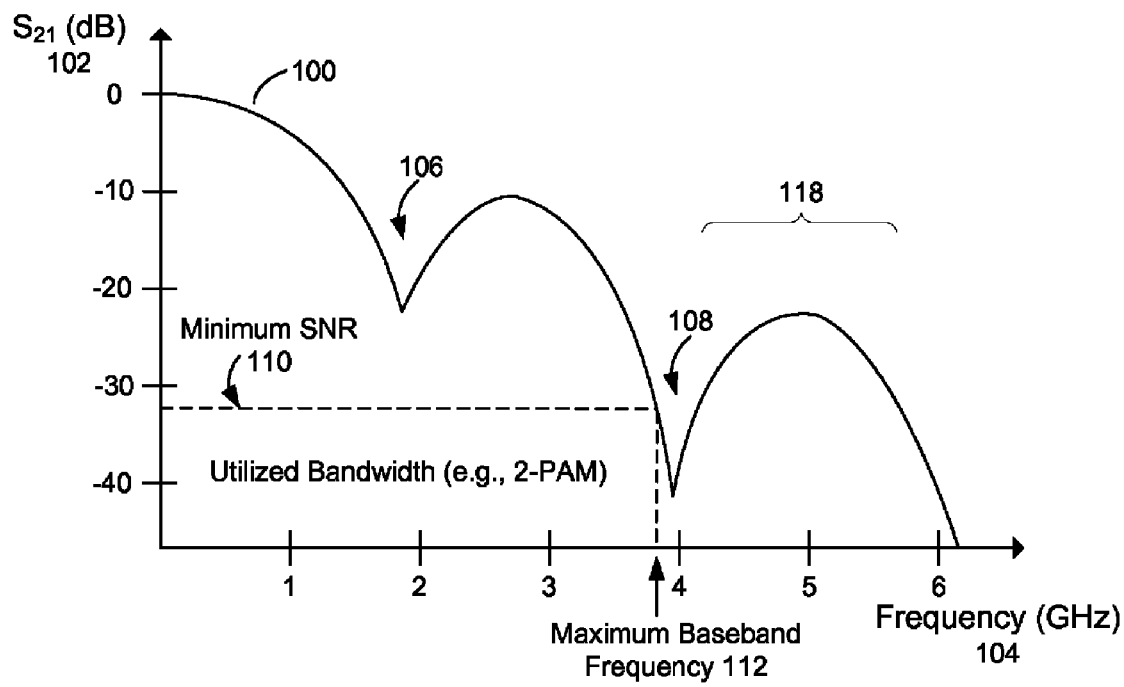
FIGS. 1A and 1B are frequency response diagrams of a data communications channel, in accordance with some embodiments

A data transmission circuit has a plurality of data preparation circuits and a combiner. Each data preparation circuit may be activated or deactivated, and each activated data preparation circuit receives a respective data stream and generates a respective sub-channel signal. Each respective data stream has a respective symbol rate and Nyquist bandwidth. The combiner combines the respective sub-channel signals to generate a data transmission signal. The bandwidth associated with the data transmission signal corresponds to a sum of Nyquist bandwidths for data streams corresponding to all of the data preparation circuits. Each data preparation circuit has a programmable linear equalizer that equalizes the respective sub-channel signal across the bandwidth of the data transmission signal.

In some embodiments, the bandwidth associated with the data transmission signal is greater than or equal to the sum of the Nyquist bandwidths for the respective data streams.

A data receiver circuit has an interface for receiving a data transmission signal having an associated bandwidth. The data transmission signal has a plurality of sub-channel signals, wherein each sub-channel signal is equalized across the bandwidth of the data transmission signal. The data receiver circuit also includes a plurality of channel separators that split the data transmission signal to produce multiple respective sub-channel signals on multiple respective sub-channels. Each sub-channel signal has a respective Nyquist bandwidth that is lower than the bandwidth of the data transmission signal. The data receiver circuit further includes a plurality of slicers that sample the respective sub-channel signals and a multi-input multi-output (MIMO) decision feedback equalizer (DFE) that generates respective offset signals to be combined with respective sub-channel signals.

A data communication system includes a plurality of data preparation circuits and a combiner. Each data preparation circuit receives a respective data stream having a respective symbol rate and Nyquist bandwidth, and generates a respective sub-channel signal. The combiner combines the respective sub-channel signals to generate a data transmission signal having an associated bandwidth greater than or equal to the sum of the Nyquist bandwidths for the respective data streams. Each data preparation circuit has a programmable linear equalizer that equalizes the respective sub-channel signal across the bandwidth of the data transmission signal. The data communication system also includes an interface for receiving the data transmission signal and a plurality of channel separators that split the received data transmission signal to produce multiple respective sub-channel signals on multiple respective sub-channels. Each sub-channel signal has a respective Nyquist bandwidth that is lower than the bandwidth of the data transmission signal. The data communication system also includes a plurality of slicers that sample the respective sub-channel signals and a multi-input multi-output (MIMO) decision feedback equalizer (DFE) that generates respective offset signals to be combined with respective sub-channel signals.

An integrated circuit includes a plurality of data preparation circuits, a combiner, and a transmitter interface. Each data preparation circuit receives a respective data stream having a respective symbol rate and Nyquist bandwidth, and generates a respective sub-channel transmission signal. The combiner combines the respective sub-channel transmission signals to generate a first data transmission signal having an associated bandwidth greater than or equal to the sum of the Nyquist bandwidths for the respective data streams. The transmitter interface transmits the first data transmission signal. In some embodiments, each data preparation circuit has a programmable linear equalizer that equalizes the respective sub-channel transmission signal across the bandwidth of the first data transmission signal. The integrated circuit also includes a receiver interface for receiving a second data transmission signal and a plurality of channel separators that split the received second data transmission signal to produce multiple respective sub-channel receiver signals on multiple respective receiver sub-channels. Each sub-channel receiver signal has a respective Nyquist bandwidth that is lower than a bandwidth of the second data transmission signal. The integrated circuit further includes a plurality of slicers that sample the respective sub-channel receiver signals and a multi-input multi-output (MIMO) decision feedback equalizer (DFE) that generates respective offset signals to be combined with respective sub-channel signals.

In a method for transmitting data, a plurality of respective data streams is received. Each respective data stream has a respective symbol rate and Nyquist bandwidth. Each respective data stream is prepared for transmission: respective sub-channel signals are generated corresponding to the respective data streams. The respective sub-channel signals are combined to generate a data transmission signal having an associated bandwidth greater than or equal to the sum of the Nyquist bandwidths for the respective data streams. Each respective sub-channel signal is equalized across the bandwidth of the data transmission signal.

In a method for receiving data, a data transmission signal having an associated bandwidth is received at an interface. The data transmission signal includes a plurality of sub-channel signals, wherein each sub-channel signal is equalized across the bandwidth of the data transmission signal. The data transmission signal is split to produce multiple respective sub-channel signals on multiple respective sub-channels. Each sub-channel signal has a respective Nyquist bandwidth that is lower than the bandwidth of the data transmission signal. The respective sub-channel signals are sampled. Respective offset signals are generated with a multi-input multi-output (MIMO) decision feedback equalizer (DFE) and are combined with respective sub-channel signals.

A method for communicating data is described. In the method, a plurality of respective data streams is received. Each respective data stream has a respective symbol rate and a respective Nyquist bandwidth. Each respective data stream is prepared for transmission: respective sub-channel signals are generated corresponding to the respective data streams. The respective sub-channel signals are combined to generate a data transmission signal having an associated bandwidth greater than or equal to the sum of the Nyquist bandwidths for the respective data streams. Each respective sub-channel signal is equalized across the bandwidth of the data transmission signal. The data transmission signal is received at an interface. The received data transmission signal is split to produce multiple respective sub-channel signals on multiple respective sub-channels. Each sub-channel signal has a respective Nyquist bandwidth that is lower than the bandwidth of the data transmission signal. The respective sub-channel signals are sampled. Respective offset signals are generated with a multi-input multi-output (MIMO) decision feedback equalizer (DFE) and are combined with respective sub-channel signals.

A method for transmitting and receiving data is described. In the method, a plurality of respective data streams is received. Each respective data stream has a respective symbol rate and a respective Nyquist bandwidth. Each respective data stream is prepared for transmission: respective sub-channel transmission signals are generated corresponding to the respective data streams. The respective sub-channel transmission signals are combined to generate a first data transmission signal having an associated bandwidth greater than or equal to the sum of the Nyquist bandwidths for the respective data streams. Each respective sub-channel transmission signal is equalized across the bandwidth of the first data transmission signal. The first data transmission signal is transmitted from a transmitter interface. A second data transmission signal is received at a receiver interface and split to produce multiple respective sub-channel receiver signals on multiple respective receiver sub-channels. Each sub-channel receiver signal has a respective Nyquist bandwidth that is lower than a bandwidth of the second data transmission signal. The respective sub-channel receiver signals are sampled. Respective offset signals are generated with a multi-input multi-output (MIMO) decision feedback equalizer (DFE) and are combined with respective sub-channel signals.

A data transmission circuit includes means for receiving a plurality of respective data streams. Each respective data stream has a respective symbol rate and Nyquist bandwidth. The data transmission circuit also includes means for preparing each respective data stream for transmission, including means for generating respective sub-channel signals corresponding to the respective data streams, and means for combining the respective sub-channel signals to generate a data transmission signal having an associated bandwidth greater than or equal to the sum of the Nyquist bandwidths for the respective data streams. The means for generating respective sub-channel signals includes means for equalizing each respective sub-channel signal across the bandwidth of the data transmission signal.

An integrated circuit includes means for receiving a plurality of respective data streams, each respective data stream having a respective symbol rate and Nyquist bandwidth, and means for preparing each respective data stream for transmission, including means for generating respective sub-channel transmission signals corresponding to the respective data streams. The integrated circuit also includes means for combining the respective sub-channel transmission signals to generate a first data transmission signal having an associated bandwidth greater than or equal to the sum of the Nyquist bandwidths for the respective data streams, and means for transmitting the first data transmission signal from a transmitter interface. The means for generating respective sub-channel transmission signals includes means for equalizing each respective sub-channel signal across the bandwidth of the first data transmission signal. The integrated circuit further includes means for receiving a second data transmission signal at a receiver interface and means for splitting the received second data transmission signal to produce multiple respective sub-channel receiver signals on multiple respective receiver sub-channels. Each sub-channel receiver signal has a respective Nyquist bandwidth that is lower than a bandwidth of the second data transmission signal. The integrated circuit further includes means for sampling the respective sub-channel receiver signals, means for generating respective offset signals with a multi-input multi-output (MIMO) decision feedback equalizer (DFE), and means for combining respective offset signals with respective sub-channel signals.

A computer readable medium contains circuit description data that, when operated on by a circuit compiler program being executed by a processor, synthesizes a data transmission circuit. The data transmission circuit includes a plurality of data preparation circuits, wherein each data preparation circuit receives a respective data stream and generates a respective sub-channel signal, and a combiner for combining the respective sub-channel signals to generate a data transmission signal having an associated bandwidth. Each respective data stream has a respective symbol rate and a respective Nyquist bandwidth. The bandwidth associated with the data transmission signal is greater than or equal to the sum of the Nyquist bandwidths for the respective data streams. In some embodiments, each data preparation circuit includes a programmable linear equalizer that equalizes the respective sub-channel signal across the bandwidth of the data transmission signal.

A computer readable medium contains circuit description data that, when operated on by a circuit compiler program being executed by a processor, synthesizes a circuit. The circuit includes a plurality of data preparation circuits, wherein each data preparation circuit receives a respective data stream having a respective symbol rate and Nyquist bandwidth, and generates a respective sub-channel transmission signal; a combiner for combining the respective sub-channel transmission signals to generate a first data transmission signal having an associated bandwidth greater than or equal to the sum of the Nyquist bandwidths for the respective data streams; and a transmitter interface for transmitting the first data transmission signal. In some embodiments, each data preparation circuit includes a programmable linear equalizer that equalizes the respective sub-channel transmission signal across the bandwidth of the first data transmission signal. The circuit also includes a receiver interface for receiving a second data transmission signal; a plurality of channel separators that split the received second data transmission signal to produce multiple respective sub-channel receiver signals on multiple respective receiver sub-channels, each sub-channel receiver signal having a respective Nyquist bandwidth that is lower than a bandwidth of the second data transmission signal; a plurality of slicers that sample the respective sub-channel receiver signals; and a multi-input multi-output (MIMO) decision feedback equalizer (DFE) that generates respective offset signals to be combined with respective sub-channel signals.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1B:
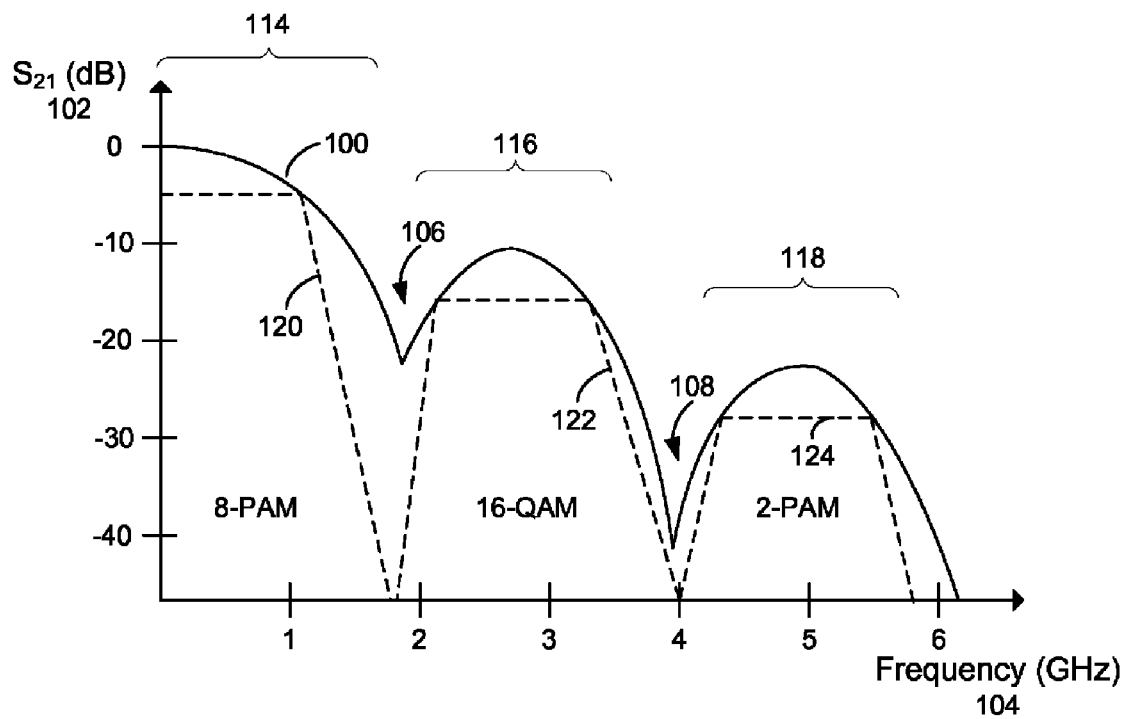

FIGS. 1A and 1B are prophetic frequency response diagrams of an exemplary data communications channel, in accordance with some embodiments. In some embodiments, the channel corresponds to a backplane link implemented as one or more traces on one or more printed circuit boards. In some embodiments, the channel corresponds to another type of data communications link, such as a channel in an Ethernet network or a signal path on a semiconductor device.

In FIGS. 1A and 1B, the frequency response 100 of the channel is represented by forward transmission coefficient S21 102 as a function of frequency 104, where S21 102 is measured in decibels (dB) and frequency 104 is measured in gigahertz (GHz). The frequency response 100 includes notches 106 and 108, which correspond to particularly lossy frequency ranges in the channel, as indicated by the low S21 values for the notches.

In some embodiments, the channel with the frequency response 100 depicted in FIGS. 1A and 1B may be used for baseband (BB) signaling. A given receiver in a data communications system that uses the channel as a baseband channel will have an associated minimum signal-to-noise ratio (SNR) 110 for signals received via the channel. The minimum SNR 110 corresponds to a maximum specified bit-error rate (BER) of the receiver. The maximum specified BER is typically the highest error rate that is consistent with proper functioning of the data communications system. If the SNR of signals transmitted to the receiver over the channel drops below the minimum SNR 110, the BER of the receiver will exceed the maximum specified BER, causing the data communications system to fail to function properly.

In the example of FIG. 1A, the value of S21 in notch 108 falls below the minimum SNR 110. Notch 108 thus places an upper limit on the maximum baseband frequency 112 for the channel and thereby limits the utilized bandwidth of the channel. Frequency range 118, located above notch 108, is unavailable for use in a baseband signaling application (e.g., 2-PAM baseband signaling), even though the S21 values for frequency range 118 exceed the minimum SNR 110: inclusion of frequency range 118 within the baseband would also include notch 108 within the baseband, but the value of S21 in notch 108 falls below the minimum SNR 110.

The utilized bandwidth of a channel with a notched frequency response may be increased by dividing the channel into sub-channels including a baseband (BB) sub-channel and one or more passband (PB) sub-channels. It may also be desirable to divide a channel with a frequency response without notches into two or more sub-channels. In some embodiments, each sub-channel is used to transmit an independent signal with a corresponding modulation. Alternately, the sub-channels may be used to implement multi-tone (MT) signaling.

FIG. 1B is a prophetic example of a frequency response 100 of a notched data communications channel divided into three sub-channels: BB sub-channel 114 and PB sub-channels 116 and 118, in accordance with some embodiments. Each sub-channel is assigned an independent signal: sub-channel 114 transmits a signal using 8-PAM modulation, sub-channel 116 transmits a signal using 16-QAM modulation (or, alternately, two 4-PAM signals in quadrature), and sub-channel 118 transmits a signal using 2-PAM modulation. Comparison of FIG. 1B to FIG. 1A illustrates the increase in bandwidth utilization resulting from dividing the channel into sub-channels: sub-channel 118 is assigned a signal in FIG. 1B; the corresponding frequency range is idle in FIG. 1A.

The sub-channel assignments shown in FIG. 1B are merely exemplary; other combinations of signals with corresponding modulations are possible. Furthermore, the available sub-channels generally will depend on the characteristics of the channel, including its frequency response and number of notches. In some embodiments, the channel may be divided into two sub-channels, or into three or more sub-channels. In some embodiments, the number of sub-channels is less than or equal to four. In some embodiments, the number of sub-channels is less than or equal to eight, or as high as sixteen. In addition, a signal need not be assigned to every sub-channel. For example, if a particular sub-channel is highly lossy and/or dispersive, no signal need be assigned to that sub-channel.

Signals transmitted on respective sub-channels are equalized to reduce inter-symbol interference (ISI) within each respective sub-channel and to reduce inter-channel interference (ICI) between sub-channels. In general, equalization refers to adjusting the frequency response of a signal to at least partially compensate for distortion of the signal, including distortion that results in interference. In some embodiments, each sub-channel has its own dedicated programmable linear equalizer in the transmitter. In the example of FIG. 1B, equalization of each sub-channel signal is limited to approximately the frequency range corresponding to the respective sub-channel. Energy corresponding to a particular signal is not found at a significant level outside of the corresponding sub-channel's assigned frequency range. For example, as indicated by signal energy distributions 120, 122, and 124 (FIG. 1B), the frequency components falling outside of the assigned sub-channel frequency range for each signal have relative signal strengths (as represented by the S21 coefficient) of less than −40 dB (where the peak signal strength of the signal is 0 dB, typically at or near zero hertz).

As described below, to achieve high-speed signaling, full-band equalization may be performed on the sub-channel signals, wherein sub-channel signals are equalized across substantially the full bandwidth associated with the channel. In some embodiments, each sub-channel has its own dedicated programmable linear equalizer in the transmitter for performing full-band equalization.

Figure 2:
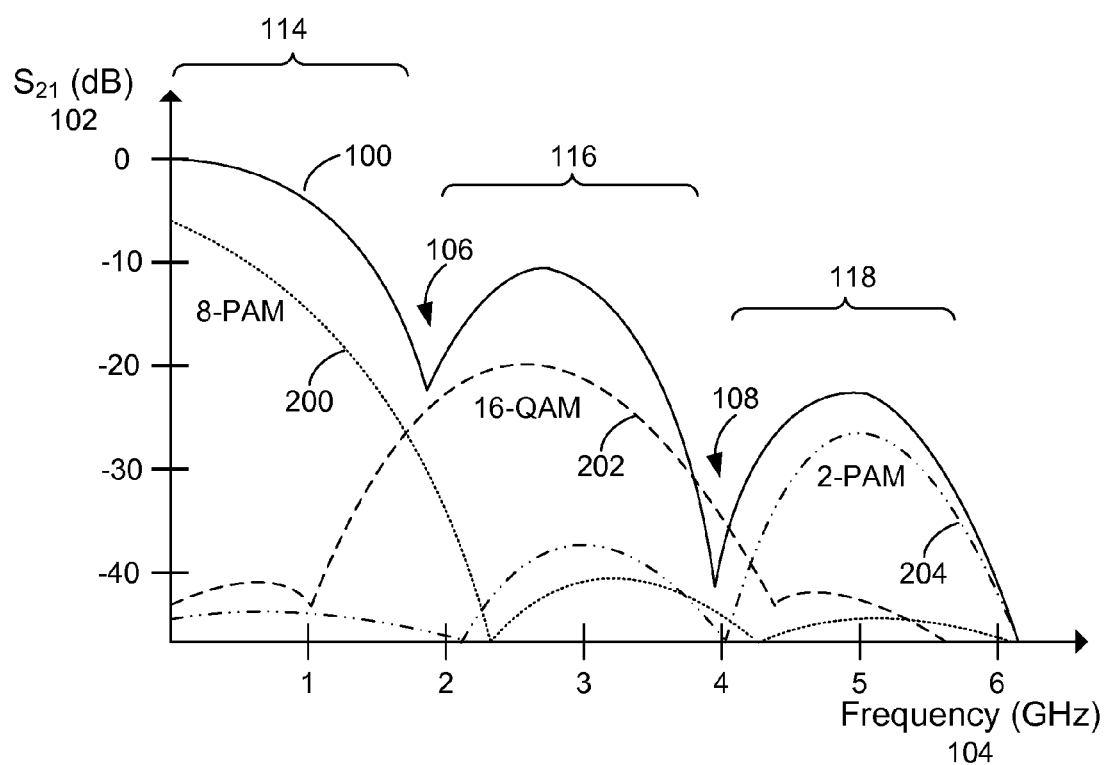
FIG. 2 is a frequency response diagram of a notched data communications channel divided into sub-channels, in accordance with some embodiments

FIG. 2 is a prophetic example of a frequency response diagram of a data communications channel divided into three sub-channels 114, 116, and 118, in accordance with some embodiments. The channel has a frequency response 100 that includes notches 106 and 108. As in FIG. 1B, each sub-channel is assigned an independent signal. In FIG. 2, however, each independent signal is equalized across the bandwidth of channel 100. A signal equalized across the bandwidth of a channel may have a significant level of energy outside of its corresponding sub-channel's assigned frequency range. For example, signal energy distribution 200, which corresponds to the signal assigned to sub-channel 114, shows a significant level of energy beyond the frequency range of sub-channel 114. Similarly, signal energy distributions 202 and 204 have significant levels of energy outside of the frequency ranges of sub-channels 116 and 118 respectively.

FIG. 3A is a block diagram of a data communications system 300 in accordance with some embodiments. Data communications system 300 has a transmitter 302, a channel 304, and a receiver 306. Channel 304 is divided into a plurality of sub-channels. In some embodiments, channel 304 has a frequency response that is notched (hereinafter sometimes referred to as a "notched channel").

Transmitter 302 receives a plurality of data streams 308. Each data stream 308 has a respective symbol rate and a respective Nyquist bandwidth. The Nyquist bandwidth of a data stream is defined as half of the symbol rate.

A data preparation circuit 309 includes a programmable linear equalizer 310 that performs full-band equalization of a respective data stream 308 and generates a respective sub-channel signal. In some embodiments, the data preparation circuits 309 are arranged in parallel. A combiner 312 combines the respective sub-channel signals to generate a data transmission signal, which is transmitted over channel 304. In some embodiments, combiner 312 is a digital to analog converter (DAC).

In some embodiments, channel 304 is divided into sub-channels, wherein each sub-channel corresponds to a specified frequency range of channel 304. Assuming that a sub-channel signal generated from a respective data stream is assigned to each sub-channel, the bandwidth across which each data stream is equalized corresponds to a sum of the Nyquist bandwidths for each data stream. Thus, each equalizer 310 operates at a rate corresponding to a sum of the Nyquist rates for the respective data streams. In some embodiments, however, one or more sub-channels are not assigned a sub-channel signal and instead are idle. Each sub-channel signal still may be equalized across the bandwidth of the channel, including the bandwidth corresponding to the idle sub-channel. In such embodiments, the bandwidth across which each sub-channel signal is equalized is greater than the sum of the Nyquist bandwidths of the data streams.

Receiver 306 receives the data transmission signal at an interface 313. A plurality of channel separators 314 separate the data transmission signal into its respective sub-channel signals. In some embodiments, the channel separators 314 are arranged in parallel. In some embodiments, channel separators 314 include channelization filters. In some embodiments, channel separators 314 include combinations of a mixer and an integrator. In some embodiments, channel separators 314 include combinations of a mixer and a filter, such as a low-pass filter.

Slicers 318 sample the respective sub-channel signals. In some embodiments, the slicers 318 are arranged in parallel. In some embodiments, the slicers 318 utilize 3-bit samplers. In some embodiments, the slicers 318 utilize 2-bit samplers or 1-bit samplers.

A multi-input multi-output (MIMO) decision feedback equalizer (DFE) 320 mitigates interference on the respective sub-channel signals. In the context of the embodiments described in this document, the term "mitigates interference" means substantially cancels or substantially reduces at least one aspect (e.g., ISI or ICI) of the interference on a sub-channel signal. A MIMO DFE also is referred to as a matrix DFE. In some embodiments, the MIMO DFE is programmable. In some embodiments, the MIMO DFE 320 mitigates interference by generating offset signals corresponding to respective sub-channel signals and providing the offset signals to the respective sub-channel signals via combiners 316, which combine the sub-channel signals with the offset signals.

In some embodiments, a respective slicer 318 has a specified minimum value of a ratio of signal strength to a combination of interference and noise (a "signal-to-interference-and-noise ratio"). If the ratio drops below the specified minimum value, the slicer will be unable to recover the respective sub-channel signal at or below a specified BER.

A separate signal-to-interference ratio is calculated for a respective sub-channel signal sampled by the respective slicer. The signal-to-interference ratio is defined as the ratio of the integral of the signal's power spectral density across the full transmission signal bandwidth over the integral of the interference energy, and is calculated after the respective sub-channel signal has been equalized. In some embodiments, the signal-to-interference ratio is less than the specified minimum signal-to-interference-and-noise ratio: after full-band equalization of the respective sub-channel signal at the transmitter and mitigation of interference by a MIMO DFE at the receiver, the slicer is able to recover the sub-channel signal with an accuracy at or below the specified BER.

A data communications system involving a channel divided into multiple sub-channels, such as system 300 (FIG. 3A), may be used to implement analog multi-tone signaling, for example in high-speed backplane links. Multi-tone (MT) systems exploit the orthogonality of a set of equally spaced sinusoids. In a multi-tone system's simplest form, one transmission block of signals is constructed as follows:

$$Y(t) = x_0 + \sum_{n=1}^{N/2} [x_{2n-1}\cos(2\pi n f_0 t) + x_{2n}\sin(2\pi n f_0 t)] \quad (1)$$

where $f_0$ is the symbol rate, N is the number of signals in the transmission block, and $x_n$ (n=0, 1 ..., N and $x_N$=0) are the digital data sequence that belongs to the transmission block.

FIG. 3B is a block diagram of a data communications system 330 implementing analog multi-tone signaling in accordance with some embodiments. Digital data sequence $x_0, \ldots, x_{N-2}, x_{N-1}$ (332) is provided in parallel to the programmable linear equalizers 310. Equalizers 310 prepare the digital data sequence for transmission by generating respective sub-channel signals equalized across the bandwidth of channel 304. Combiner 312 combines the respective sub-channel signals into a data transmission signal, which is transmitted over channel 304.

Receiver 336 receives the data transmission signal and separates it into respective sub-channel signals using channel separators. In some embodiments, a respective channel separator includes a mixer 338 and an integrator 340. The input to each mixer 338 is the data transmission signal and the sinusoidal function from equation (1) corresponding to the respective sub-channel signal.

As described with regard to FIG. 1A, slicers 318 sample the respective sub-channel signals. A MIMO DFE 320 mitigates interference on the respective sub-channel signals.

In some embodiments, instead of receiving a plurality of independent data streams, a transmitter may receive a single input data stream. The input data stream is separated into multiple data streams and transmitted over multiple sub-channels as described above. The input data stream is reconstituted from the respective sub-channel signals at the receiver.

Figure 3C:
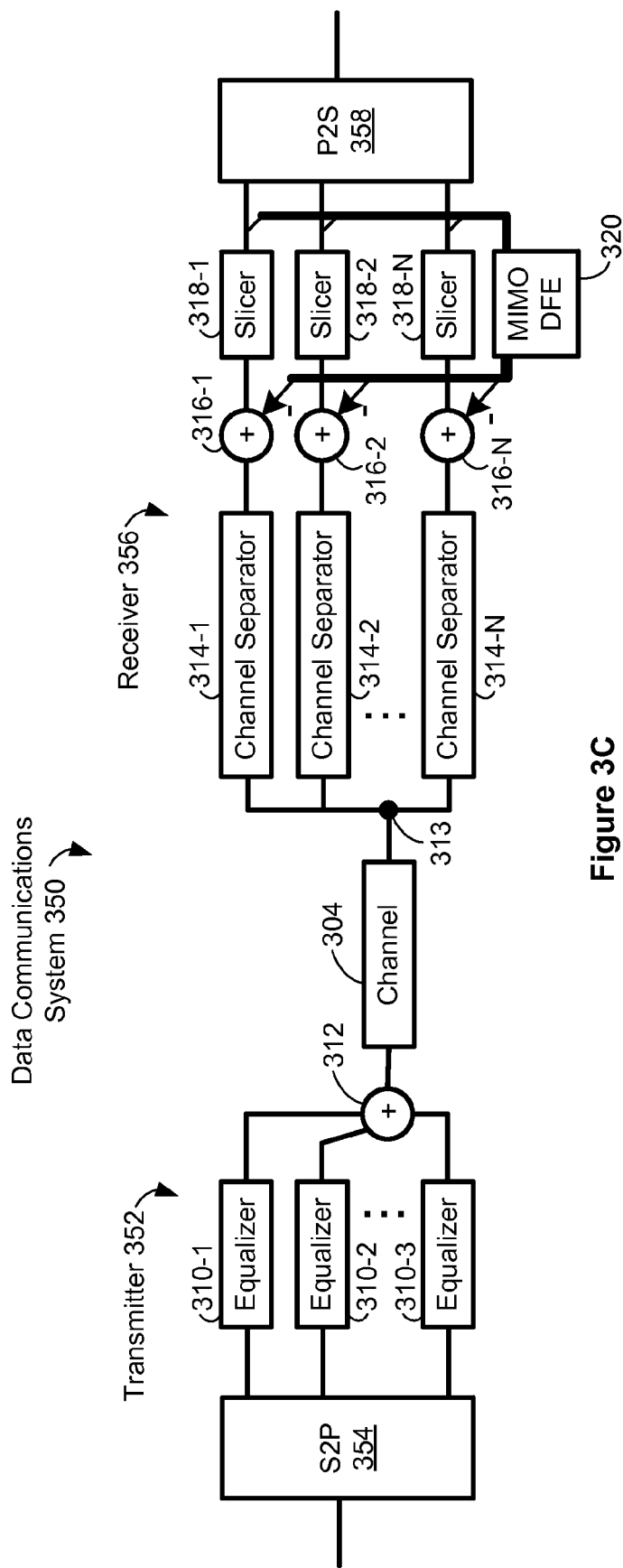

FIG. 3C is a block diagram of a data communications system 350 that receives a single input data stream, in accordance with some embodiments. Data communications system 300 includes a transmitter 352, a channel 304, and a receiver 356. As noted above, channel 304 is divided into a plurality of sub-channels. Transmitter 352 includes, in addition to the components of transmitter 302 (FIG. 3A), a serial-to-parallel (S2P) converter 354. S2P converter 354 receives the single input data stream and converts the received data stream into a plurality of parallel data streams corresponding to data streams 308.

Receiver 356 (FIG. 3C) optionally includes, in addition to the components of receiver 306 (FIG. 3A), a parallel-to-serial (P2S) converter 358. P2S converter 358 receives the sub-channel signals sampled by the slicers 318 and combines them into a single output data stream.

In some embodiments, one or more transmitters and one or more receivers may be implemented together in a single integrated circuit (i.e., on a single chip), thereby allowing the integrated circuit to transmit and receive signals over one or more channels that are divided into sub-channels.

Figure 3D:
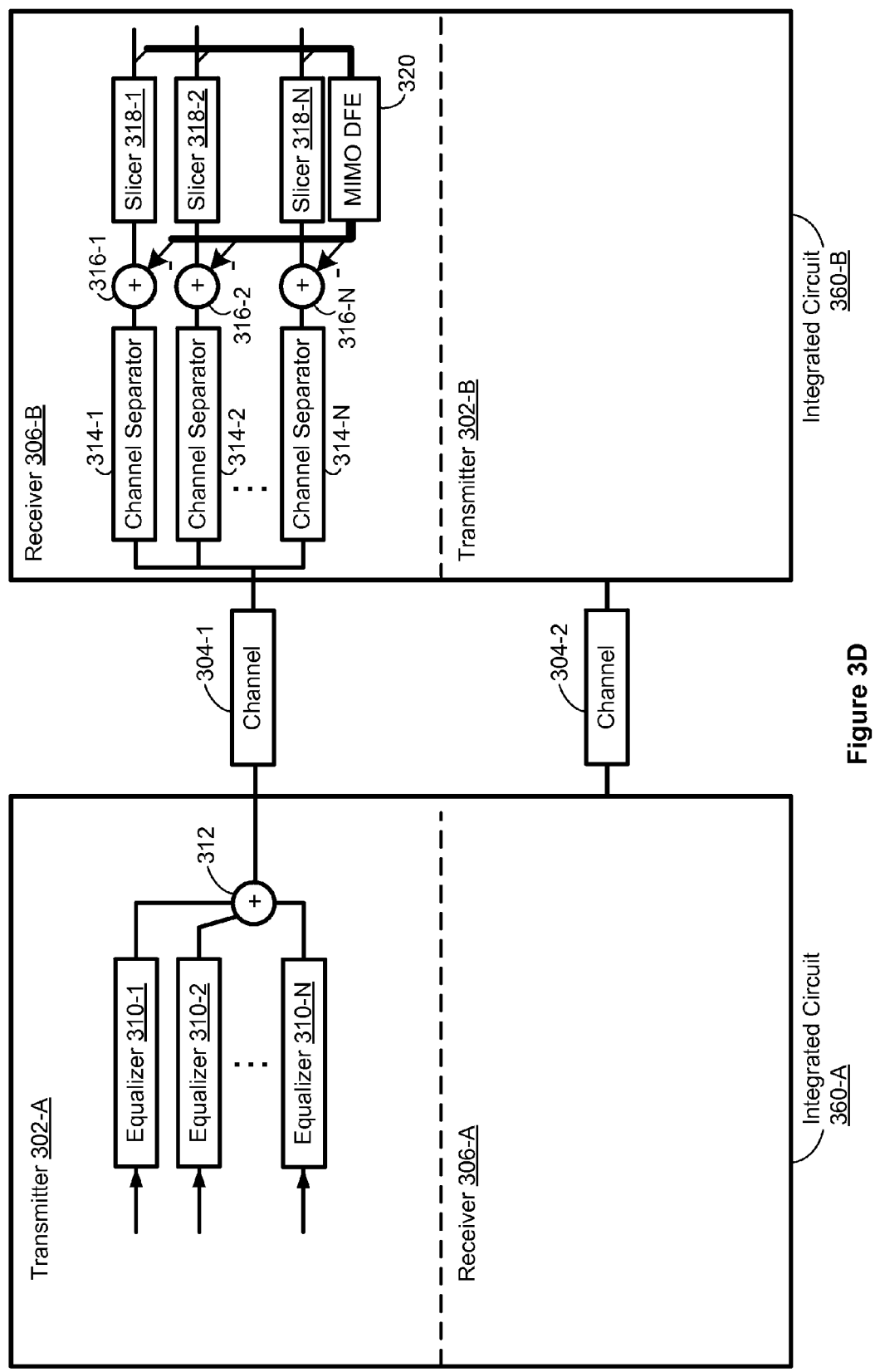
FIG. 3D is a block diagram of two integrated circuits, each including a transmitter and a receiver, in accordance with some embodiments.

FIG. 3D is a block diagram of two integrated circuits 360-A and 360-B, each having a transmitter 302 and a receiver 306, in accordance with some embodiments. Each transmitter 302 includes the components described above with regard to FIG. 3A, and may also include a serial-to-parallel converter (not shown). Similarly, each receiver 306 includes the components described above with regard to FIG. 3A, and may also include a parallel-to-serial converter (not shown). Integrated circuit 360-A may transmit a first data transmission signal to integrated circuit 360-B via channel 304-1 and may receive a second data transmission signal from integrated circuit 360-B via channel 304-2. Alternatively, integrated circuit 360-A may both transmit and receive data transmission signals via a single channel (not shown). The first and second data transmission signals each include two or more sub-channel signals equalized across the bandwidth of the respective data transmission signals.

Figure 3E:
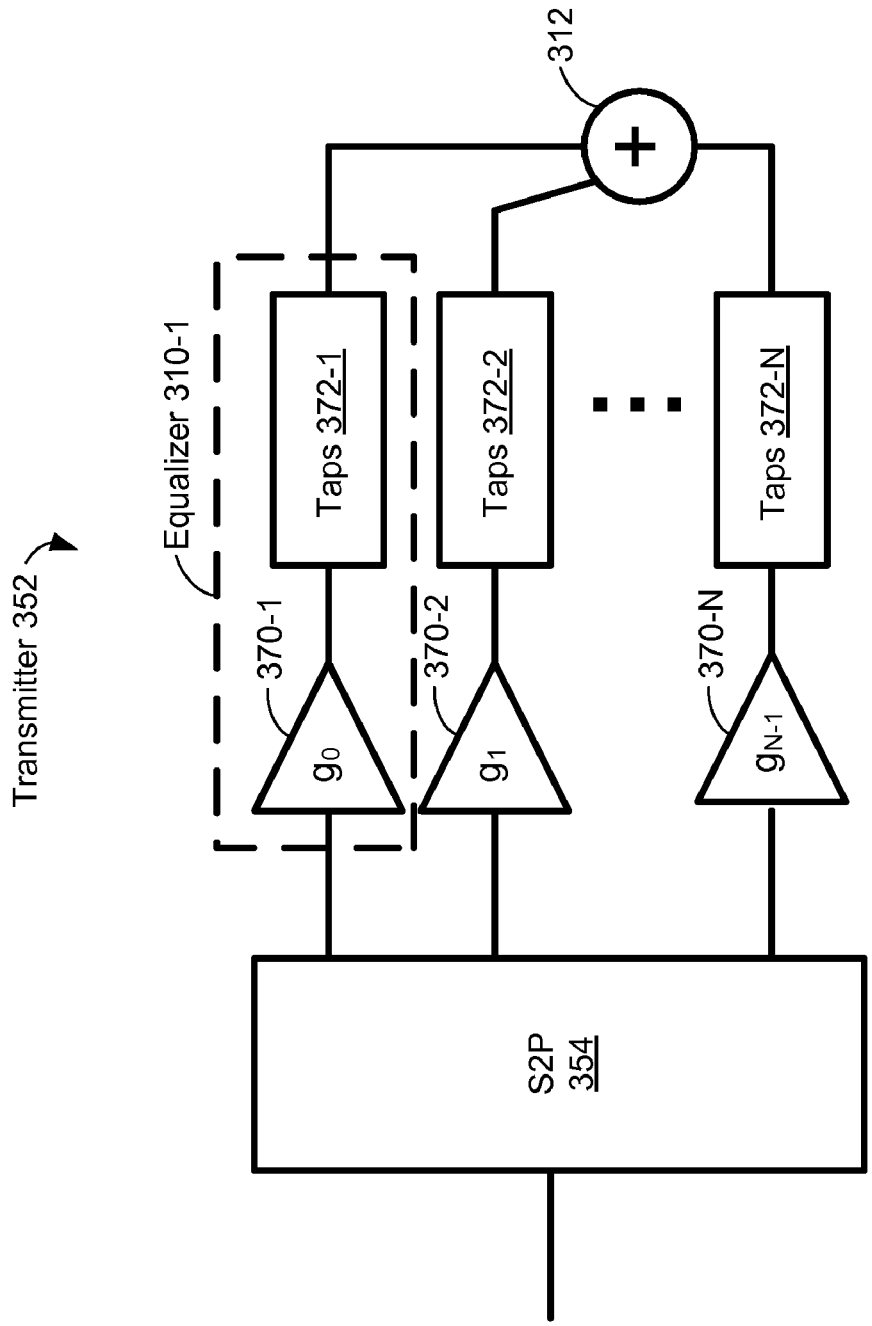
FIG. 3E is a block diagram of a transmitter in accordance with some embodiments.

Attention is now directed to embodiments of transmitters that include programmable linear equalizers for performing full-band equalization of sub-channel signals. In some embodiments, a respective equalizer 310 of transmitter 352 (FIG. 3C), or transmitter 302 (FIG. 3A), has a gain stage 370 and a plurality of taps 372, as shown in FIG. 3E in accordance with some embodiments. The plurality of taps 372-1 corresponding to a first sub-channel are programmed with a plurality of tap coefficients to reduce inter-symbol interference and inter-channel interference, while gain stage 370-1 is programmed to allocate power for the first sub-channel.

Figure 4A:
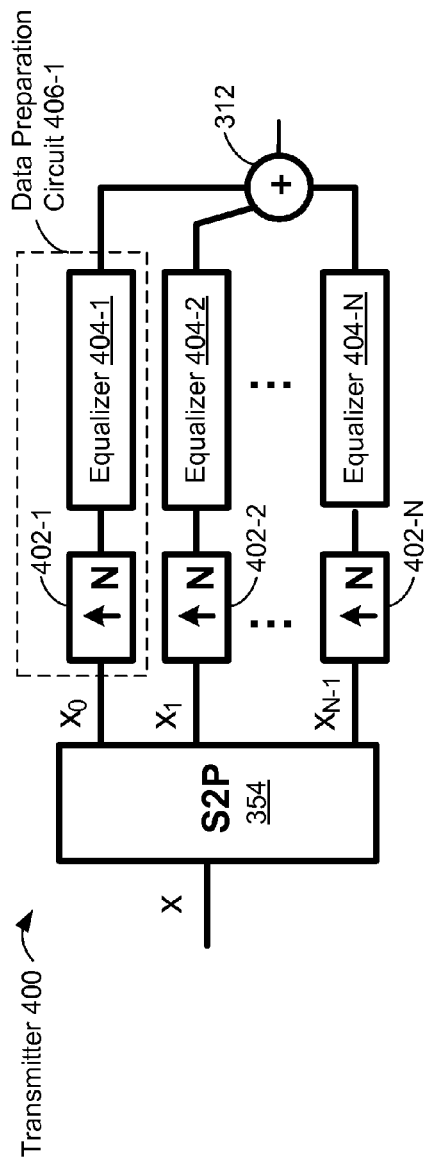
FIGS. 4A-4B are block diagrams of a transmitter with a polyphase equalization scheme for each sub-channel signal.

In some embodiments, a polyphase design is used to implement full-band equalization. FIG. 4A is a block diagram of a transmitter 400 with polyphase equalization for each sub-channel signal. Serial-to-parallel converter 354 receives an input data stream X and separates the input data stream into multiple respective data streams $X_0, X_1, \ldots, X_{N-1}$. Each respective data stream is provided to a data preparation circuit 406 that in some embodiments includes an up-sampler 402 and a programmable linear equalizer 404. In some embodiments, the data preparation circuits 406 are arranged in parallel. Up-sampler 402 has a sampling rate equal to N times the symbol rate of the respective data stream. In some embodiments, N is an integer greater than or equal to the number of data preparation circuits. Up-sampler 402 thus generates N phases of the respective data stream, which are provided in turn to an equalizer 404. Equalizer 404 performs full-band equalization of the N phases. A combiner 312 combines the output of the equalizers 404 into a data transmission signal that is transmitted onto a channel.

Figure 4B:
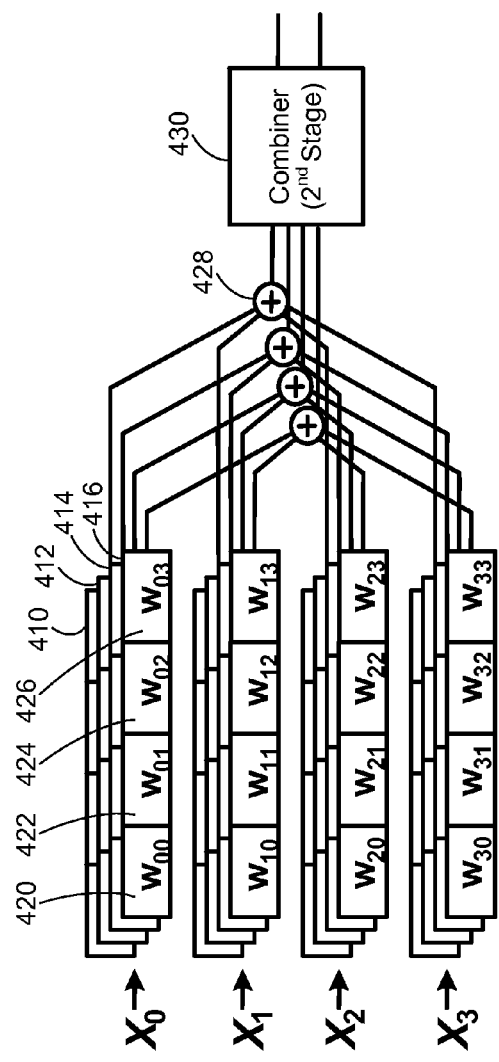

In some embodiments, a programmable linear equalizer 404 includes a plurality of sub-equalizers 410, 412, 414, and 416, as illustrated in FIG. 4B. Each sub-equalizer has a plurality of taps. For example, in FIG. 4B, each sub-equalizer has four taps (e.g., sub-equalizer 416 comprises taps 420, 422, 424, and 426 with corresponding tap coefficients $w_{00}, w_{01}, w_{02},$ and $w_{03}$). Each sub-equalizer receives and equalizes a respective phase of the respective data stream. The illustrated polyphase implementation, with four sub-equalizers each having four taps, thus provides the same level of equalization as a single linear equalizer with 16 taps.

In some embodiments, combiner 312 includes two stages: a plurality of summers 428 and a second-stage circuit 430. Each summer 428 receives an output of a sub-equalizer from each of the equalizers 404 and transmits the summed outputs to the second-stage circuit 430. Second stage circuit 430, which in some embodiments is a DAC, combines the outputs from the plurality of summers to generate a data transmission signal.

Full-band equalization of each sub-channel at the transmitter may not be sufficient to fully compensate for interference, including inter-symbol interference (ISI) and inter-channel interference (ICI), for each sub-channel signal. Therefore, in some embodiments, a MIMO decision-feedback equalizer (DFE) is employed at the receiver (e.g., receivers 306, 336, and 356, FIGS. 3A-3C) to mitigate the remaining interference. A MIMO DFE has a matrix of values used to calculate offsets that the MIMO DFE provides to sub-channel receiver signals (e.g., via combiners 316, FIG. 3A).

FIG. 5 is a schematic illustration of matrix elements associated with a matrix 500 of a MIMO DFE in accordance with some embodiments. Diagonal matrix elements (e.g., element 502) are used to control mitigation of ISI for a particular sub-channel, but do not result in mitigation of ICI. Non-diagonal matrix elements (e.g., element 504) are used to control mitigation of ICI; non-diagonal matrix elements correspond to cross-sub-channel mitigation terms. In some embodiments, all non-diagonal matrix elements are zero, such that the MIMO DFE does not include cross-sub-channel mitigation terms and does not mitigate ICI. In other embodiments, one or more non-diagonal matrix elements are non-zero, such that the MIMO DFE includes one or more cross-sub-channel mitigation terms that mitigate ICI. In some embodiments, the values of the matrix elements are programmable, thus allowing the BER of a particular receiver to be minimized. See Wen-Chih Kan and Gerald E. Sobelman, "Efficient DFE Architecture for MIMO Communication Systems," ISSOC 2005, for a discussion of MIMO DFE's, which is hereby incorporated by reference as background information.

Figure 6:
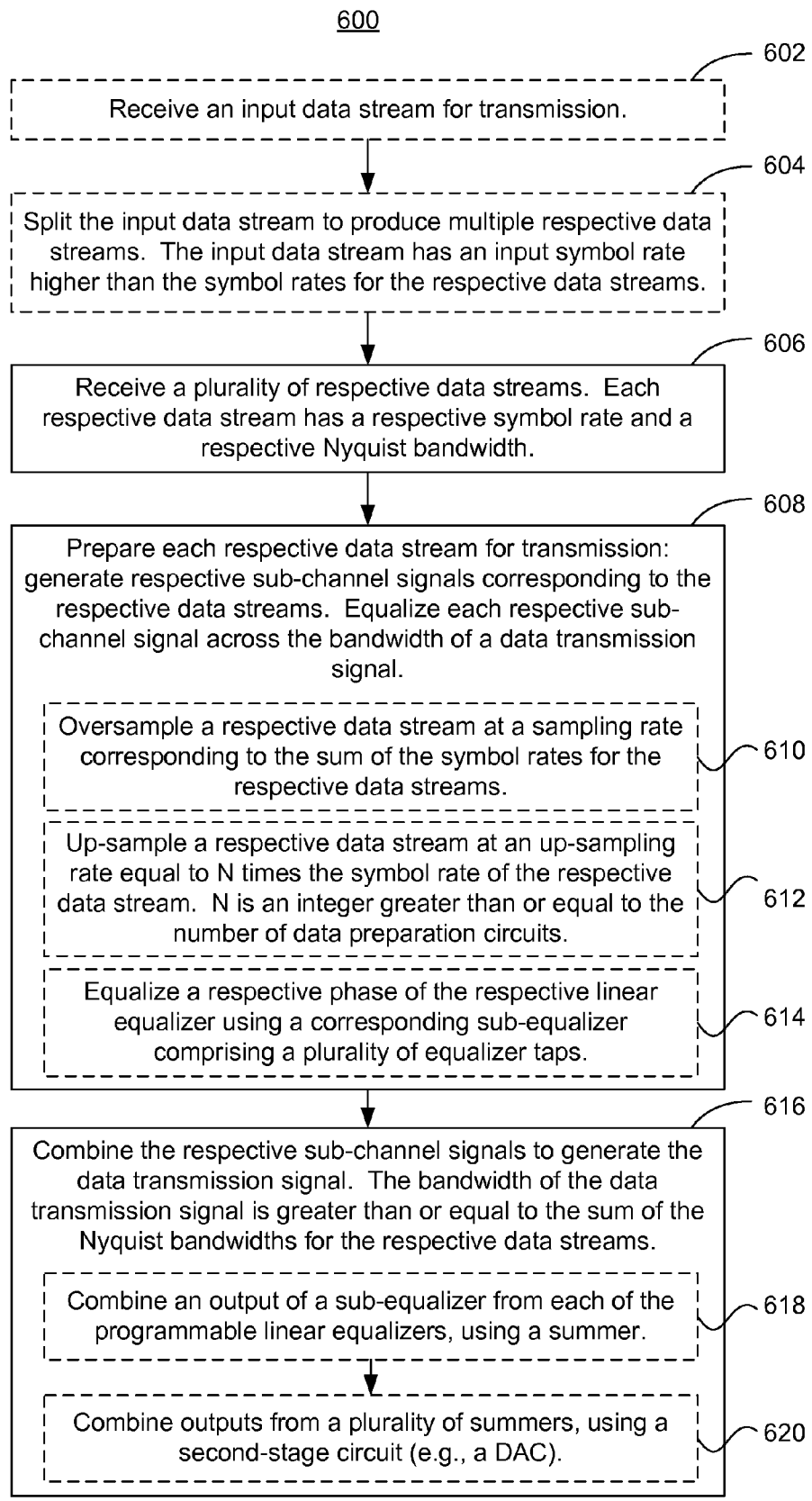
FIG. 6 is a flow diagram illustrating a process for transmitting data in accordance with some embodiments.

FIG. 6 is a flow diagram illustrating a process 600 for transmitting data in accordance with some embodiments. In some embodiments, process 600 is performed in conjunction with a transmitter in a data communications system (e.g., transmitter 302, FIG. 3A; transmitter 352, FIG. 3C; or transmitter 400, FIG. 4A).

In some embodiments, an input data stream is received for transmission (602). The input data stream is split to produce multiple respective data streams. The input data stream has an input symbol rate higher than the symbol rates for the respective data streams (604). For example, S2P converter 354 (FIG. 3C) receives an input data stream and splits the input data stream into multiple respective data streams.

A plurality of respective data streams (e.g., data streams 308, FIG. 3A) are received. Each respective data stream has a respective symbol rate and a respective Nyquist bandwidth (606). In embodiments that include operations 602 and 604, the plurality of respective data streams corresponds to the multiple respective data streams into which the input data stream is split. Alternatively, the respective data streams are independent data streams.

Each respective data stream is prepared for transmission (e.g., by a data preparation circuit 309, FIG. 3A, or 406, FIG. 4A). Respective sub-channel signals are generated corresponding to the respective data streams. In some embodiments, the respective data streams are prepared in parallel for transmission, such that the corresponding respective sub-channel signals are generated in parallel. Each respective sub-channel signal is equalized across the bandwidth of a data transmission signal (608) (the data transmission signal is generated in operation 616 below). For example, each respective sub-channel signal is equalized by a programmable linear equalizer 310 (FIG. 3A) or 404 (FIG. 4A). In some embodiments, a respective data stream is oversampled at a sampling rate corresponding to the sum of the symbol rates for the respective data streams (610). In some embodiments, a respective data stream is up-sampled (e.g., by an up-sampler 402, FIG. 4A) at an up-sampling rate equal to N times the symbol rate of the respective data stream, where N is an integer greater than or equal to the number of data preparation circuits that prepare the respective data streams for transmission (612). In some embodiments, a respective phase of the oversampled data stream (e.g., one of the N phases) is equalized using a corresponding sub-equalizer having a plurality of equalizer taps (614). For example, each of sub-equalizers 410, 412, 414, and 416 (FIG. 4B) equalizes a respective phase of the data stream generated by a respective up-sampler 402.

The respective sub-channel signals are combined (e.g., by combiner 312, FIG. 3A) to generate the data transmission signal. The bandwidth of the data transmission signal is greater than or equal to the sum of Nyquist bandwidths for the respective data streams (616).

In some embodiments, an output of a sub-equalizer (e.g., sub-equalizer 410, FIG. 4B) from each of the programmable linear equalizers is combined, using a summer (e.g., summer 428) (618). The outputs from a plurality of summers are subsequently combined, using a second stage circuit (e.g., second stage circuit 430, which may be a DAC) (620).

In some embodiments, one or more of the data preparation circuits that prepare each respective data stream for transmission is deactivated. Each respective sub-channel signal still may be equalized across the bandwidth associated with the data transmission signal, including the bandwidth associated with a sub-channel corresponding to a deactivated data preparation circuit. Thus, in some embodiments, the bandwidth associated with the data transmission signal corresponds to a sum of Nyquist bandwidths for data streams corresponding to all of the data preparation circuits, including deactivated data preparation circuits. In terms of the respective data streams prepared for transmission by activated data preparation circuits, the bandwidth associated with the data transmission signal is greater than the sum of the Nyquist bandwidths for the respective data streams if one or more data preparation circuits have been deactivated.

Figure 7:
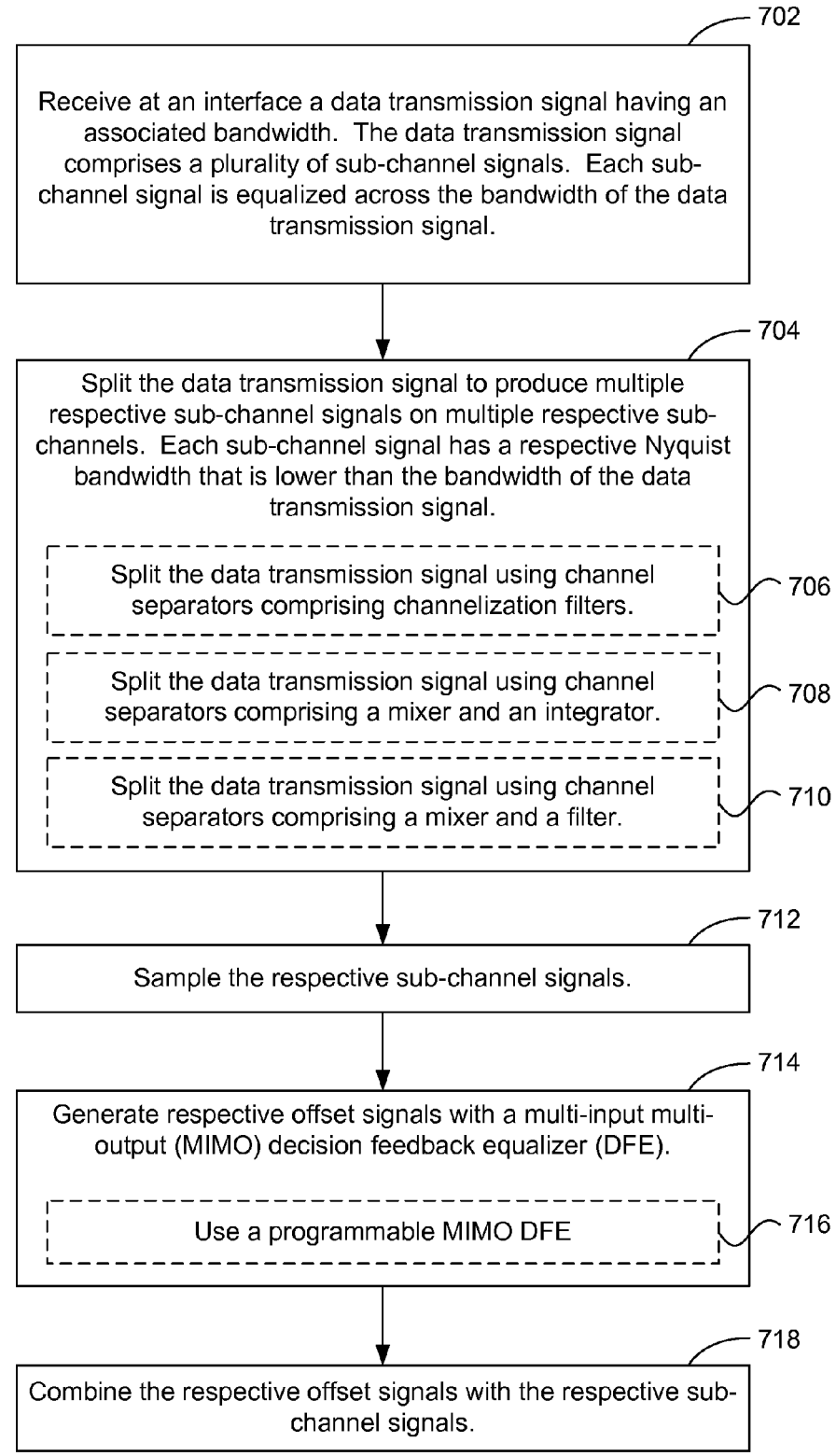
FIG. 7 is a flow diagram illustrating a process for receiving data in accordance with some embodiments.

FIG. 7 is a flow diagram illustrating a process 700 for receiving data in accordance with some embodiments. In some embodiments, process 700 is performed in conjunction with a receiver in a data communications system (e.g., receiver 306, FIG. 3A; receiver 336, FIG. 3B; or receiver 356, FIG. 3C).

A data transmission signal having an associated bandwidth is received at an interface. For example, the data transmission channel is received at interface 313 between receiver 306 and channel 304 (FIG. 3A). The data transmission signal has a plurality of sub-channel signals. In some embodiments, each sub-channel signal in the received signal has been equalized across the bandwidth of the data transmission signal. (702).

The data transmission signal is split (e.g., using channel separators 314, FIG. 3A) to produce multiple respective sub-channel signals on multiple respective sub-channels. Each sub-channel signal has a respective Nyquist bandwidth that is lower than the bandwidth of the data transmission signal (704). In some embodiments, the data transmission signal is split using channel separators, such as channelization filters (706). In some embodiments, the data transmission signal is split using channel separators, each having a mixer and an integrator (e.g., mixer 338 and integrator 340, FIG. 3B) (708). In some embodiments, the data transmission signal is split using channel separators, each having a mixer and a filter (710).

The respective sub-channel signals are sampled (712). For example, the respective sub-channel signals are sampled by slicers 318 (FIG. 3A).

Interference on the respective sub-channels may be mitigated with a MIMO DFE (e.g., MIMO DFE 320, FIG. 3A). The MIMO DFE generates respective offset signals (714). In some embodiments, the MIMO DFE is programmable (716). The respective offset signals are combined with the respective sub-channel signals (718) (e.g., via combiners 316, FIG. 3A).

Figure 8:
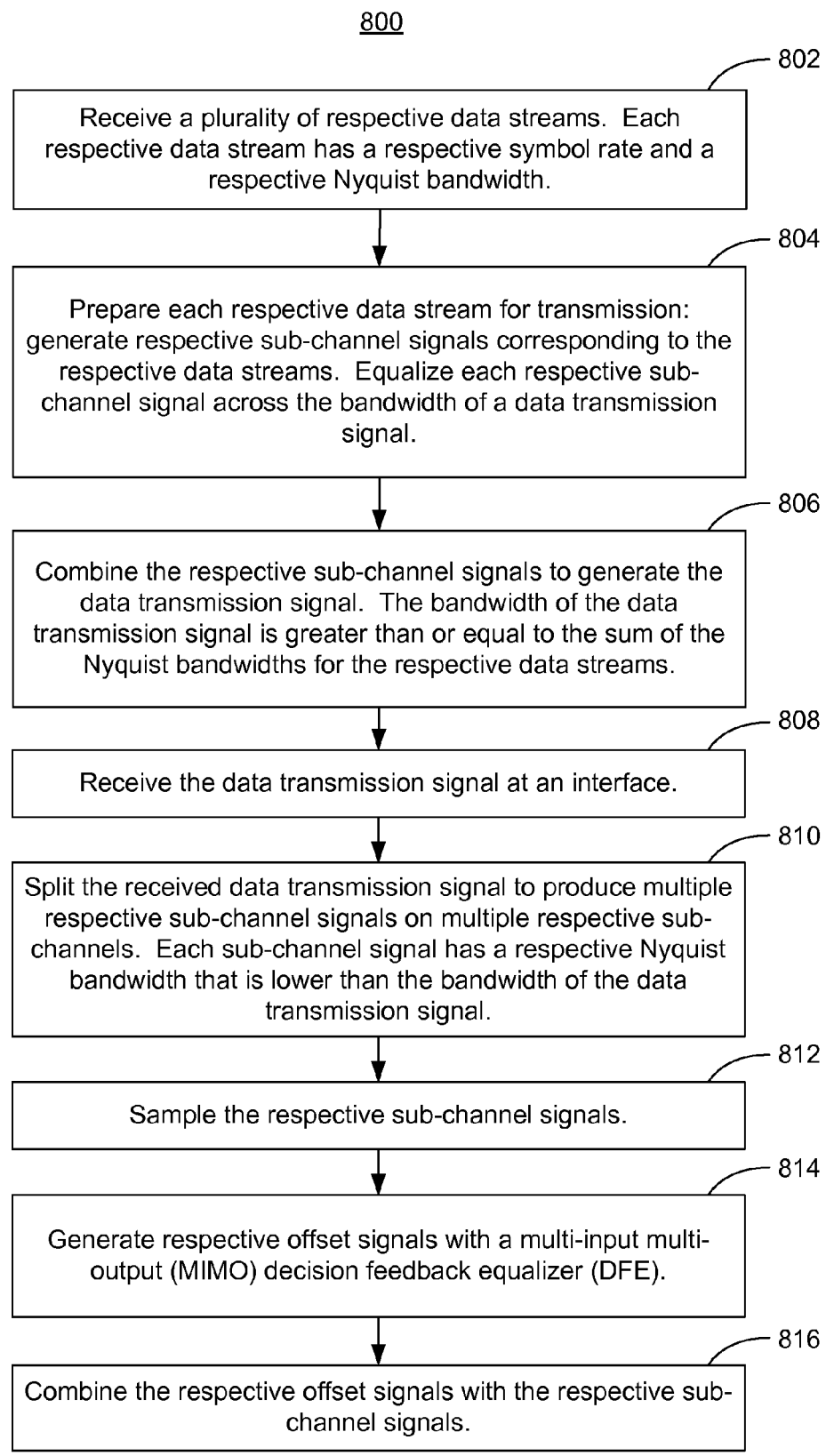
FIG. 8 is a flow diagram illustrating a process for communicating data in accordance with some embodiments.

FIG. 8 is a flow diagram illustrating a process 800 for communicating data in accordance with some embodiments. In some embodiments, process 800 is performed in conjunction with a data communications system (e.g., system 300, FIG. 3A; system 330, FIG. 3B; or system 350, FIG. 3C).

A plurality of respective data streams (e.g. data streams 308, FIG. 3A) are received. Each respective data stream has a respective symbol rate and a respective Nyquist bandwidth (802).

Each respective data stream is prepared for transmission. Respective sub-channel signals are generated corresponding to the respective data streams. Each respective sub-channel signal is equalized across the bandwidth of a data transmission signal (804). In some embodiments, the respective data streams are prepared in parallel for transmission, such that the corresponding respective sub-channel signals are generated in parallel.

The respective sub-channel signals are combined (e.g., using combiner 312, FIG. 3A, or a plurality of summers 428 and a second-stage circuit 430, FIG. 4B) to generate the data transmission signal. The bandwidth of the data transmission signal is greater than or equal to the sum of the Nyquist bandwidths for the respective data streams (806).

The data transmission signal is received at an interface (808). For example, the data transmission channel is received at interface 313 between receiver 306 and channel 304 (FIG. 3A).

The received data transmission signal is split (e.g., using channel separators 314) to produce multiple respective sub-channel signals on multiple respective sub-channels. Each sub-channel signal has a respective Nyquist bandwidth that is lower than the bandwidth of the data transmission signal (810). The respective sub-channel signals are sampled (812). For example, the respective sub-channel signals are sampled by slicers 318.

Interference on the respective sub-channels may be mitigated with a MIMO DFE (e.g., MIMO DFE 320). The MIMO DFE generates respective offset signals (814). The respective offset signals are combined with the respective sub-channel signals (816) (e.g., via combiners 316).

Figure 9:
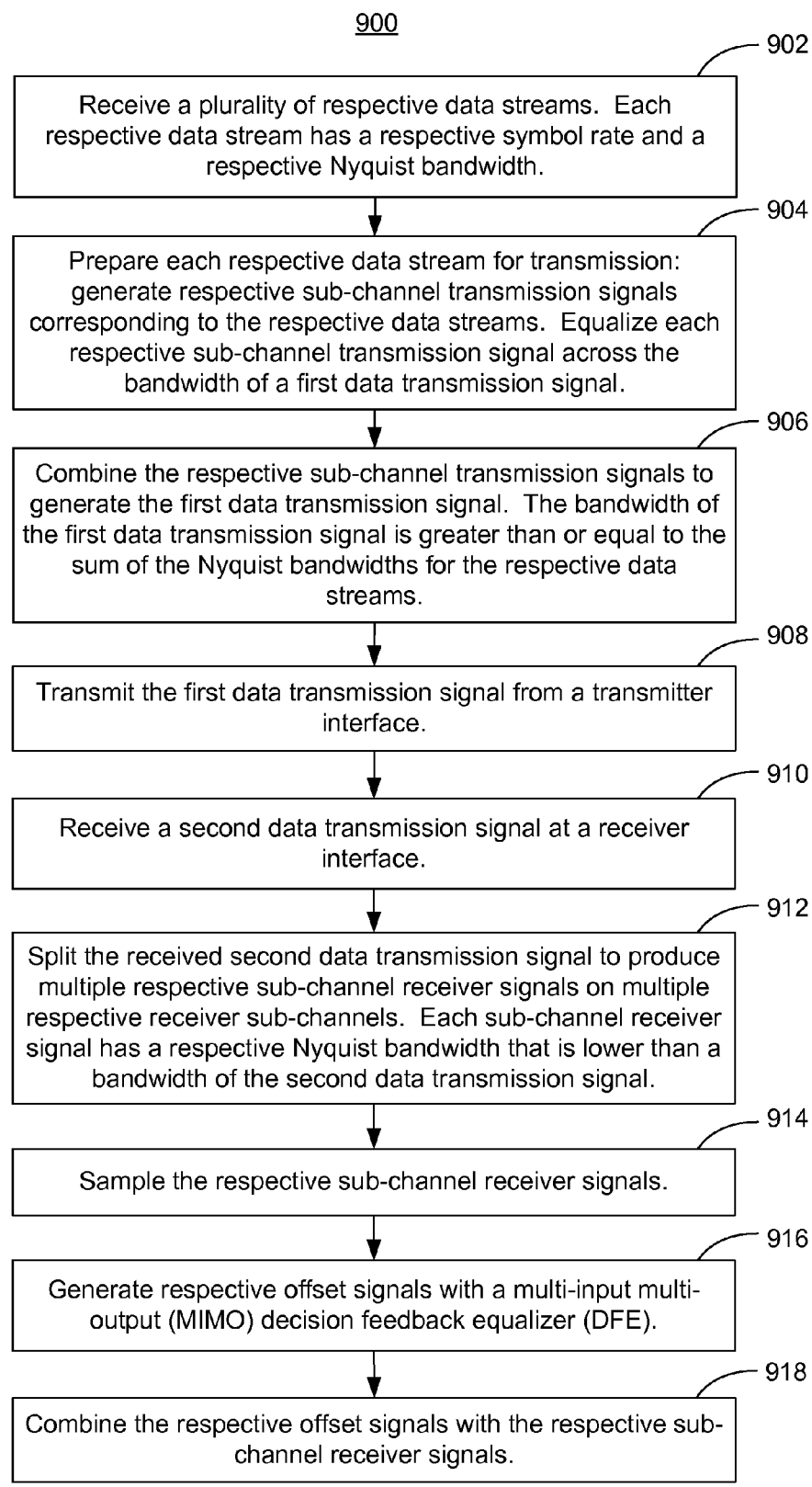
FIG. 9 is a flow diagram illustrating a process for transmitting and receiving data in accordance with some embodiments.

FIG. 9 is a flow diagram illustrating a process 900 for transmitting and receiving data in accordance with some embodiments. In some embodiments, process 900 is performed in conjunction with an integrated circuit having a transmitter and a receiver (e.g., IC 360-A or IC 360-B, FIG. 3D).

A plurality of respective data streams (e.g. data streams 308, FIG. 3A) are received. Each respective data stream has a respective symbol rate and a respective Nyquist bandwidth (902).

Each respective data stream is prepared for transmission. Respective sub-channel transmission signals are generated corresponding to the respective data streams. Each respective sub-channel transmission signal is equalized across the bandwidth of a first data transmission signal (904). In some embodiments, the respective data streams are received in parallel and prepared in parallel for transmission, such that the corresponding respective sub-channel transmission signals are generated in parallel.

The respective sub-channel transmission signals are combined (e.g., using combiner 312, FIG. 3D, or a plurality of summers 428 and a second-stage circuit 430, FIG. 4B) to generate the first data transmission signal. The bandwidth of the first data transmission signal is greater than or equal to the sum of the Nyquist bandwidths for the respective data streams (906). The first data transmission signal is transmitted from a transmitter interface (e.g., an interface between transmitter 302-A and channel 304-1, FIG. 3D) (908).

A second data transmission signal is received at a receiver interface (910). For example, the data transmission channel is received at an interface between receiver 306-A and channel 304-2 (FIG. 3D).

The received second data transmission signal is split (e.g., using channel separators 314 in receiver 306-A) to produce multiple respective sub-channel receiver signals on multiple respective receiver sub-channels. Each sub-channel receiver signal has a respective Nyquist bandwidth that is lower than a bandwidth of the second data transmission signal (912). The respective sub-channel receiver signals are sampled (e.g., by slicers 318 in receiver 306-A) (914).

Interference on the respective receiver sub-channels may be mitigated with a MIMO DFE (e.g., MIMO DFE 320 in receiver 306-A). The MIMO DFE generates respective offset signals (916). The respective offset signals are combined with the respective sub-channel receiver signals (918) (e.g., via combiners 316).

Figure 10:
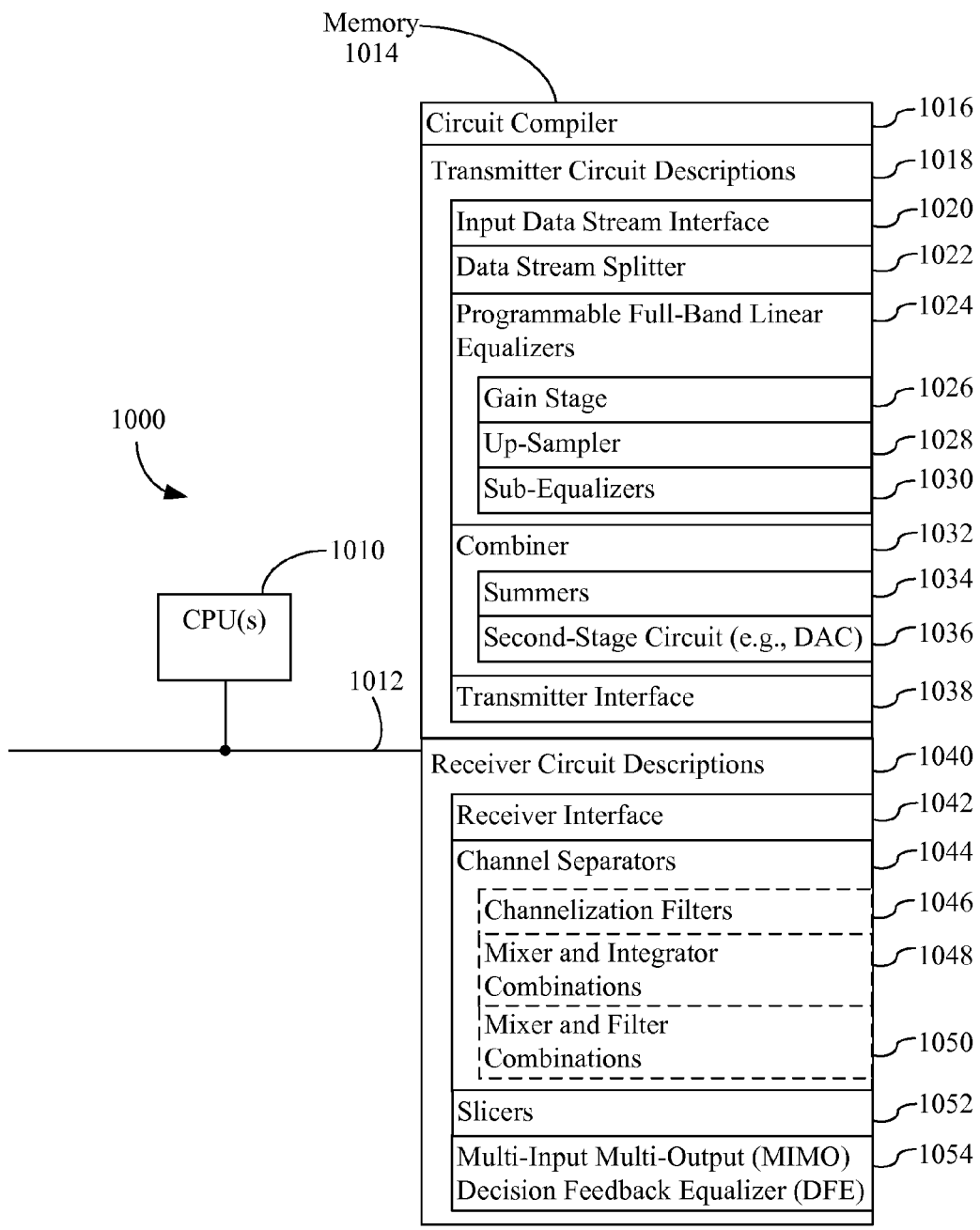
FIG. 10 is a block diagram of an embodiment of a system for storing computer readable files containing software descriptions of circuits for implementing transmitters and receivers in accordance with some embodiments.

FIG. 10 is a block diagram of an embodiment of a system 1000 for storing computer readable files containing software descriptions of circuits for implementing transmitters and receivers in accordance with some embodiments. The system 1000 may include at least one data processor or central processing unit (CPU) 1010, memory 1014, and one or more signal lines or communication busses 1012 for coupling these components to one another. Memory 1014 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1014 may optionally include one or more storage devices remotely located from the CPU(s) 1010. In some embodiments, memory 1014 stores in one or more of the previously mentioned memory devices a circuit compiler 1016, transmitter circuit descriptions 1018, and receiver circuit descriptions 1040. The circuit compiler 1016, when executed by a processor such as CPU 1010, processes one or more circuit descriptions to synthesize one or more corresponding circuits.

In some embodiments, transmitter circuit descriptions 1018 include circuit descriptions for an input data stream interface 1020, a data stream splitter 1022 (e.g., S2P converter 354, FIG. 3C), programmable full-band linear equalizers 1024, a combiner 1032, and a transmitter interface 1038. In some embodiments, the circuit description for programmable full-band linear equalizers 1024 includes circuit descriptions for gain stages 1026, up-samplers 1028, and sub-equalizers 1030. In some embodiments, the circuit description for combiner 1032 includes circuit descriptions for a plurality of summers 1034 and a second-stage circuit (e.g., a DAC) 1036. In some embodiments, the programmable full-band linear equalizers are arranged in parallel.

In some embodiments, receiver circuit descriptions 1040 include circuit descriptions for a receiver interface 1042, channel separators 1044, slicers 1052, and a MIMO DFE 1054. In some embodiments, the circuit descriptions for channel separators 1044 include circuit descriptions for channelization filters 1046, combinations of a mixer and an integrator 1048, and/or combinations of a mixer and a filter 1050. In some embodiments, the channel separators and the slicers are each arranged in parallel.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A data transmission circuit, comprising:
a plurality of data preparation circuits, each data preparation circuit to be activated or deactivated, and each activated data preparation circuit to receive a respective data stream and to generate a respective sub-channel signal having an associated sub-channel signal bandwidth; and a combiner to combine the respective sub-channel signals to generate a data transmission signal having an associated signal bandwidth;

wherein:

each respective data stream has a respective symbol rate;

the signal bandwidth associated with the data transmission signal is greater than or equal to a sum of sub-channel signal bandwidths for data streams corresponding to some of the data preparation circuits; and each data preparation circuit comprises a respective programmable linear equalizer to equalize the respective sub-channel signal across the signal bandwidth associated with the data transmission signal.

2. The data transmission circuit of claim 1, wherein each programmable linear equalizer is an oversampled programmable linear equalizer that operates at a sampling rate corresponding to the sum of the symbol rates for the respective data streams.

3. The data transmission circuit of claim 1, further comprising:

an interface to receive an input data stream for transmission; and a data stream splitter to split the input data stream to produce multiple respective data streams, the input data stream having an input symbol rate that is higher than the symbol rates for the respective data streams;

wherein the multiple respective data streams correspond to the respective data streams received by the data preparation circuits.

4. The data transmission circuit of claim 1, wherein each programmable linear equalizer comprises a gain stage and a plurality of equalizer taps.

5. The data transmission circuit of claim 4, wherein:

each data preparation circuit further comprises an up-sampler, the up-sampler having a corresponding up-sampling rate equal to N times the symbol rate of the respective data stream, where N is an integer greater than or equal to the number of data preparation circuits; and the number of equalizer taps in the plurality of equalizer taps is greater than N.

6. The data transmission circuit of claim 5, wherein each programmable linear equalizer comprises a plurality of sub-equalizers, wherein each sub-equalizer corresponds to a respective phase of the respective linear equalizer and wherein each sub-equalizer comprises a plurality of equalizer taps.

7. The data transmission circuit of claim 6, wherein the combiner comprises a plurality of summers and a second-stage circuit, each summer to receive an output of a sub-equalizer from each of the programmable linear equalizers, the second-stage circuit to receive and combine outputs from the plurality of summers.

8. The data transmission circuit of claim 7, wherein the second-stage circuit comprises a digital-to-analog signal converter.

9. The data transmission circuit of claim 1, wherein the signal bandwidth of the data transmission signal is wideband and of at least 3 GHz, and wherein the multiple data streams comprise at least three data streams.

10. A data communication system, comprising:

a plurality of data preparation circuits, each data preparation circuit to receive a respective data stream having a respective symbol rate and a respective sub-channel signal bandwidth and to generate a respective sub-channel signal;

a combiner to combine the respective sub-channel signals to generate a data transmission signal having an associated signal bandwidth greater than or equal to the sum of the sub-channel signal bandwidths for the respective data streams;

an interface to receive the data transmission signal;

a plurality of channel separators to split the received data transmission signal to produce multiple respective sub-channel signals on multiple respective sub-channels, each sub-channel signal having a respective sub-channel signal bandwidth that is smaller than the signal bandwidth of the data transmission signal;

a plurality of slicers to sample the respective sub-channel signals; and a multi-input multi-output (MIMO) decision feedback equalizer (DFE) to generate respective offset signals to be combined with the respective sub-channel signals;

wherein each data preparation circuit comprises a programmable linear equalizer to equalize the respective sub-channel signal across the signal bandwidth of the data transmission signal.

11. The data communication system of claim 10, wherein each programmable linear equalizer is an oversampled programmable linear equalizer operating at a sampling rate corresponding to the sum of the symbol rates for the respective data streams.

12. The data communication system of claim 10, wherein:

the signal bandwidth of the data transmission signal corresponds to a plurality of sub-channel signal bandwidths of the sub-channels;

each respective sub-channel signal is uniquely assigned to a respective sub-channel; and a signal-to-interference ratio for a respective sub-channel signal is less than a signal-to-interference-and-noise ratio necessary for a respective slicer to recover the sub-channel signal at or below a specified bit error rate, wherein the signal-to-interference ratio is calculated after the sub-channel signals have been equalized.

13. The data communication system of claim 10, further comprising:

an interface to receive an input data stream for transmission;

a data stream splitter to split the input data stream to produce multiple respective data streams, the input data stream having an input symbol rate that is higher than the symbol rates for the respective data streams;

wherein the multiple respective data streams correspond to the respective data streams received by the data preparation circuits.

14. The data communication system of claim 10, wherein each programmable linear equalizer comprises a gain stage and a plurality of equalizer taps.

15. The data communication system of claim 14, wherein:

each data preparation circuit further comprises an up-sampler, the up-sampler having a corresponding up-sampling rate equal to N times the symbol rate of the respective data stream, where N is an integer greater than or equal to the number of data preparation circuits; and the number of equalizer taps in the plurality of equalizer taps is greater than N.

16. The data communication system of claim 15, wherein each programmable linear equalizer comprises a plurality of sub-equalizers, wherein each sub-equalizer corresponds to a respective phase of the respective linear equalizer and wherein each sub-equalizer comprises a plurality of equalizer taps.

17. The data communication system of claim 16, wherein the combiner comprises a plurality of summers and a second-stage circuit, each summer to receive an output of a sub-equalizer from each of the programmable linear equalizers, the second-stage circuit to receive and combine outputs from the plurality of summers.

18. The data communication system of claim 17, wherein the second-stage circuit comprises a digital-to-analog signal converter.

19. The data communication system of claim 10, wherein the signal bandwidth of the data transmission signal is wideband and of at least 3 GHz, and wherein the multiple data streams comprise at least three data streams.

20. An integrated circuit, comprising:
a plurality of data preparation circuits, each data preparation circuit to receive a respective data stream having a respective symbol rate and a respective sub-channel signal bandwidth and to generate a respective sub-channel transmission signal;
a combiner to combine the respective sub-channel transmission signals to generate a first data transmission signal having an associated signal bandwidth greater than or equal to the sum of the sub-channel signal bandwidths for the respective data streams;
a transmitter interface to transmit the first data transmission signal;
a receiver interface to receive a second data transmission signal;
a plurality of channel separators to split the received second data transmission signal to produce multiple respective sub-channel receiver signals on multiple respective receiver sub-channels, each sub-channel receiver signal having a respective sub-channel signal bandwidth that is smaller than a signal bandwidth of the second data transmission signal;
a plurality of slicers to sample the respective sub-channel receiver signals; and
a multi-input multi-output (MIMO) decision feedback equalizer (DFE) to generate respective offset signals to be combined with the respective sub-channel receiver signals;
wherein each data preparation circuit comprises a programmable linear equalizer to equalize the respective sub-channel transmission signal across the signal bandwidth of the first data transmission signal.

21. The integrated circuit of claim 20, wherein each programmable linear equalizer is an oversampled programmable linear equalizer operating at a sampling rate corresponding to the sum of the symbol rates for the respective data streams.

22. The integrated circuit of claim 20, further comprising:
an interface to receive an input data stream for transmission; and
a data stream splitter to split the input data stream to produce multiple respective data streams, the input data stream having an input symbol rate that is higher than the symbol rates for the respective data streams;
wherein the multiple respective data streams correspond to the respective data streams received by the data preparation circuits.

23. The integrated circuit of claim 20, wherein each programmable linear equalizer comprises a gain stage and a plurality of equalizer taps.

24. The integrated circuit of claim 23, wherein:
each data preparation circuit further comprises an up-sampler, the up-sampler having a corresponding up-sampling rate equal to N times the symbol rate of the respective data stream, where N is an integer greater than or equal to the number of data preparation circuits; and
the number of equalizer taps in the plurality of equalizer taps is greater than N.

25. The integrated circuit of claim 24, wherein each programmable linear equalizer comprises a plurality of sub-equalizers, wherein each sub-equalizer corresponds to a respective phase of the respective linear equalizer and wherein each sub-equalizer comprises a plurality of equalizer taps.

26. The integrated circuit of claim 20, wherein the signal bandwidth of the data transmission signal is wideband and of at least 3 GHz, and wherein the multiple data streams comprise at least three data streams.

27. A method for transmitting data, comprising:
receiving a plurality of respective data streams, each respective data stream having a respective symbol rate and a respective sub-channel signal bandwidth;
preparing each respective data stream for transmission, the preparing comprising:
generating respective sub-channel signals corresponding to the respective data streams, and
equalizing each respective sub-channel signal; and
combining the respective sub-channel signals to generate a data transmission signal having an associated signal bandwidth greater than or equal to the sum of the sub-channel signal bandwidths for some of the respective data streams;
wherein each respective sub-channel signal is equalized across the signal bandwidth of the data transmission signal.

28. The method of claim 27, wherein the plurality of respective data streams comprises three or more respective data streams.

29. A method for transmitting and receiving data, comprising:
receiving a plurality of respective data streams, each respective data stream having a respective symbol rate and a respective sub-channel signal bandwidth;
preparing each respective data stream for transmission, the preparing comprising:
generating respective sub-channel transmission signals corresponding to the respective data streams, and
equalizing each respective sub-channel transmission signal;
combining the respective sub-channel transmission signals to generate a first data transmission signal having an associated signal bandwidth greater than or equal to the sum of the sub-channel signal bandwidths for the respective data streams;
transmitting the first data transmission signal from a transmitter interface;
receiving a second data transmission signal at a receiver interface;
splitting the received second data transmission signal to produce multiple respective sub-channel receiver signals on multiple respective receiver sub-channels, each sub-channel receiver signal having a respective sub-channel signal bandwidth that is smaller than a signal bandwidth of the second data transmission signal;
sampling the respective sub-channel receiver signals;
generating respective offset signals with a multi-input multi-output (MIMO) decision feedback equalizer (DFE); and
combining the respective offset signals with the respective sub-channel receiver signals;

wherein each respective sub-channel transmission signal is equalized across the signal bandwidth of the first data transmission signal.

30. The method of claim 29, wherein the plurality of respective data streams comprises three or more respective data streams.

* * * * *